United States Patent Office 3,116,474
Patented Dec. 31, 1963

3,116,474

PHOTOCONDUCTIVE-ELECTROLUMINESCENT INFORMATION STORAGE APPARATUS

Donald H. Smith, Gatley, Cheadle, and George R. Hoffman, Sale, England, assignors, by mesne assignments, to International Business Machines Corporation, New York, N.Y., a corporation of New York Filed Apr. 27, 1959, Ser. No. 809,251
Claims priority, application Great Britain May 1, 1958
2 Claims. (Cl. 340—173)

Figure 1:
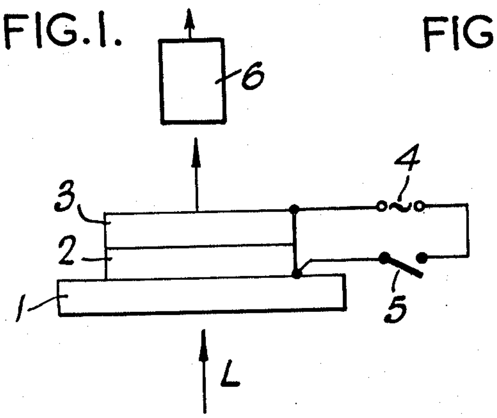

This invention relates to information storage apparatus of a kind suitable for use in digital electronic computers.

Information stored in digital computers may be classified as of two kinds, namely that which is retained during one or more operations involving a comparatively small total time and that which is required throughout prolonged sequences of operations. It is desirable that the latter kind of information be permanently stored during that sequence of operations so that it is readily accessible at any time and the present invention is concerned with storage apparatus suitable for that purpose.

Desirable features of storage apparatus for information of the second kind just mentioned are (i) That information obtainable therefrom should be accessible at high speed, (ii) That reading of information is not destructive of that information, (iii) That the information content should be readily changeable, (iv) That such storage should be simple, compact and economical, and (v) That the information should not be lost if the equipment is shut down for a time.

We are not aware of any conventional storage arrangement which satisfactorily meets these requirements and it is the object of the present invention to provide a storage arrangement which meets most if not all of these requirements.

Consider, for example, a simple arrangement comprising a light source and a light detector such as a photomultiplier tube responsive to the source. A binary bit of information may be represented by allowing the light source to illuminate the photomultiplier so as to represent one form of information, a binary digit "1" say, or masking the light from the photomultiplier to represent another kind of information, a binary digit "0" say. If a multiplicity of such elements are assembled to form a store, the contents of the store may be read by examining each element in turn and this may be effected in several ways. The selection of any one element may be achieved by switching the individual light source associated with it and examining the output of a photomultiplier common to a number of elements, or a common light source could be used and a separate photomultiplier provided for each element. The former expedient might well be slow due to thermal inertia and either expedient is likely to be uneconomic in as far as a separate lamp or photomultiplier is required for each binary bit. Mechanical switching of the light beam itself could be used to render each light path between a light source and the photomultiplier effective in turn, the output of the photomultiplier being examined as each path, corresponding to each binary bit, is uncovered, but such an arrangement is clearly unsuitable for high speed operation.

However, one form of light source which is effectively instantaneous on energisation that is, within 1 microsecond, is the fluorescence of electroluminescent materials and it is proposed to make use of this characteristic in the present invention. This fluorescence is caused by subjecting the material to changes of potential, for example to an alternating potential which may be at high frequency. It is proposed, for the purposes of this invention to use as a light source the fluorescence of an electroluminescent material and to represent bits of binary information by the presence or absence of such fluorescence. In addition it is proposed to use as a control element for controlling the energisation of the electroluminescent material a photoconductive material constituting a path of controllable resistivity for the voltage energising the electroluminescent material. Thus, the electroluminescent material provides a light source which can be rapidly switched on and off by the switching on and off of an alternating energising voltage while the photoconductive control element provides a readily controllable but relatively slow acting switch for determining whether the electroluminescent element is to represent a "0" or a "1" in the binary notation. However, although a photoconductive element is slow in reacting to incident light to attain a low resistance state, this time being of the order of 100 milliseconds, once having been put into such a state the conduction time of a signal applied to such an element is effectively negligible, or at most of the same order as the reaction time of an electroluminescent element when energised. Moreover, both the electroluminescent and the photoconductive elements lend themselves to the construction of compact matrices suitable for storage of large numbers of bits of binary information.

According to the present invention, therefore, information storage apparatus is provided comprising a plurality of electroluminescent elements each associated with a bit of information to be stored, a plurality of photoconductive elements each being series-connected with a corresponding one of said electroluminescent elements, means for maintaining, without continuous fluorescence of any of said electroluminescent elements, each of said photoconductive elements in one of two predetermined states of conductivity appropriate to the significance of a bit to be stored, means for selectively and temporarily electrically energising, or selectively interrogating, each series-connection of electroluminescent element and photoconductive element to ascertain the state of conductivity of each photoconductive element, and means for detecting fluorescence of any of said electroluminescent elements in response to said selective energisation.

Figure 2:
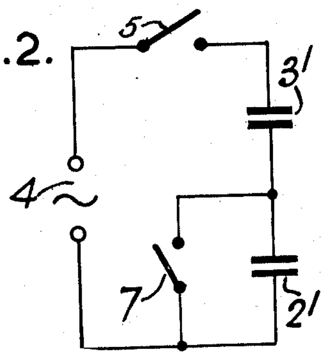
Figures 3, 4:
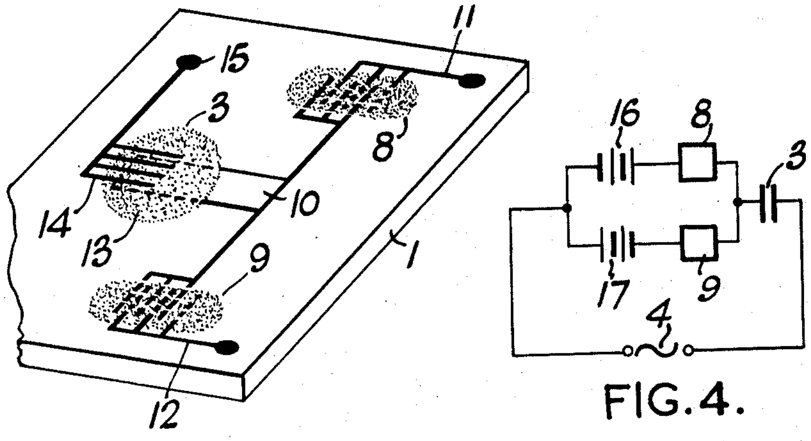
Figure 6:
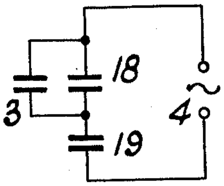
Figure 5:
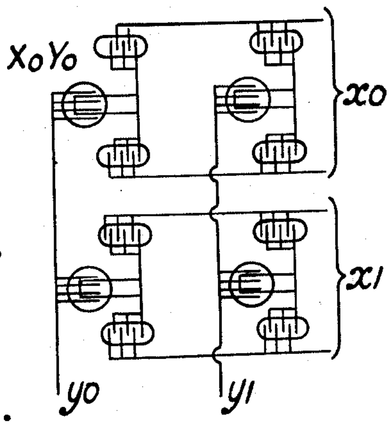
Figure 7:
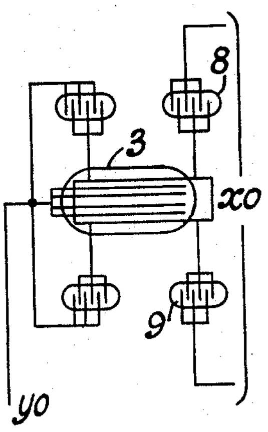

In order that the present invention may be clearly understood and readily carried into effect, the same will now be more fully described with reference to the accompanying drawings, in which:

FIG. 1 is a simple diagram of a combined photoconductive-electroluminescent single digit store according to the invention, FIG. 2 is an equivalent circuit of the arrangement of FIG. 1, FIG. 3 illustrates a preferred example of a single digit store derived from the arrangement of FIG. 1, FIG. 4 is a circuit illustrative of one mode of operating the arrangement of FIG. 3, FIG. 5 illustrates an information store of the matrix type comprising units such as illustrated by FIG. 3, FIG. 6 is a circuit illustrative of another mode of operating the arrangement of FIG. 3, and FIG. 7 illustrates a digit store derived from the arrangement of FIG. 6 which may be employed as a matrix store unit.

In FIG. 1, reference 1 denotes a glass plate on which is deposited an element 2 of photoconductive material. On top of the element 2 a further element 3 of electroluminescent material 3 is deposited. An alternating voltage source 4 is connected between terminals on the elements 2 and 3 as shown.

The operation of this arrangement is such that, as described above, when the element 2 is not illuminated it offers a high resistance to the source 4 so that the element 3 does not fluoresce. However, if the element 2 is illuminated, then the resistance offered to the source 4 is lowered to such an extent that the element 3 is energised and fluoresces.

This arrangement may readily be used for permanent storage of a binary digit by continuously illuminating or not the element 2 by means of a light source L to represent a "1" or "0," for example. The provision of a switch 5, normally open circuited, in the connection to voltage source 4 then allows the significance of the stored digit to be determined by temporary closure of the switch 5. The element 3 will fluoresce or not depending on whether or not element 2 is illuminated and so signify the nature of the stored digit as a "1"or "0." This significance may be utilised by disposing a photo-multiplier 6, for example, in front of element 3 so as to generate a pulse output in the event of temporary fluorescence of the element 3.

FIG. 2 is an equivalent circuit of the arrangement of FIG. 1 in which capacitor 2′ and switch 7 represent the photoconductive element 2, the switch 7 being closed in the event of illumination from the light source L and being open in the absence of such illumination. Capacitor 3′ represents the electroluminescent element 3.

It can be shown that no matter how high the dark resistivity of the photoconductive element 2 there is always a voltage $nV/(n+1)$ across the element 3, where V is the voltage of source 4 and $n$ is the ratio of the capacity of 2′ to the capacity of 3′. Thus, as the latter ratio $n$ increases so also does the discrimination between the fluorescence of the electro-luminescent element 3 when element 2 is illuminated as compared with any fluorescence when element 2 is not illuminated.

In the arrangement of FIG. 1 this desideratum may be partially achieved by making the element 3 as thin as possible compared to element 2. However, at the same time the element 2 is required to be thin so as to cause body conductivity by penetration of the light from source L.

FIG. 3 illustrates a preferred arrangement of the present invention. In FIG. 3 there are two opaque photoconductive elements 8 and 9 deposited on interleaved pairs of conductors in "comb" form, as shown. These conductors may be printed, in any conventional manner, on to a glass plate 1. By printing both conductors of a photoconductive element on to a base and depositing the phosphor material on the top of the conductors, the conductors obtained are of an unvaried geometrical lay-out so that a plurality of virtually identical elements may be produced. This is in contrast to the usual method of making photoconductive elements by printing interleaved conductors on top of the layer of photoconductive material. This layer will normally have a non-uniform surface so that the elements cannot be made as nearly identical to one another as they can by the above method.

The photoconductive layers are made sufficiently thick to be opaque.

One of each of the pairs of conductors of the elements 8 and 9 is connected to a common printed planar electrode 10 while the remaining conductors are connected to different printed leads 11 and 12, respectively.

The electroluminescent element 3 consists of a layer of electroluminescent material 13 deposited on top of the electrode 10 and a comb electrode 14 is deposited on top of the electroluminescent material, as shown. The base of the electrode 14 may be extended at one extreme to form a terminal 15. The comb elements of electrode 14 and the material 13 therebetween may be covered by a transparent gold film to ensure connection between the electrode 14 and material 13.

By the use of two photoconductive elements 8 and 9 advantage may be taken of the arrangement described by B. Kazan in an article of the Proceedings of the I.R.E. of October 1957, and entitled "An Improved High Gain Panel Light Amplifier." It is preferred to use the arrangement in which equal and opposite D.C. sources 16 and 17 are connected between the conductors 11 and 12 of FIG. 3 respectively, and a common A.C. source (4) terminal, the other A.C. source terminal being connected to terminal 15 of the element 3, and this arrangement is represented by FIG. 4. By virtue of this arrangement the light output of the element 3 is considerably increased when the elements 8 and 9 (or just one of them) are illuminated as compared with the arrangement without D.C. sources.

The elements 8 and 9 may be illuminated or not by suitable light sources so that the arrangement of FIG. 3 forms a rapid access binary store operating in similar manner to that of FIG. 1. However, the advantages of FIG. 3 are that the light output of element 3 is considerably increased in the event of illumination of elements 8 and 9 and all the electrodes and conductors may be produced by "printing" techniques which result in uniform and accurate geometry of layout.

The arrangement of FIG. 3 may readily be employed to form the basis of a storage matrix such as shown in FIG. 5. In FIG. 5 an array of storage units as shown in FIG. 3 is formed by connecting corresponding photoconductive element conductors to form rows denoted by $x_0$, $x_1$, . . . and the top electrodes of the electroluminescent elements are connected to conductors to form columns denoted by $y_0$, $y_1$, . . . , as shown. In this arrangement a single light source can be used for the different photoconductive elements of a number of units, by interposing a mask between this source and the appropriate photoconductive elements so that only predetermined elements are illuminated. Also, since the photoconductive material deposits are opaque no light will pass through the plane of the array. Clearly a punched card type of mask is suitable for this purpose and the stored binary information may be readily changed by changing the mask.

The row and column conductors in the array must not contact (as shown) and this may be avoided by depositing insulating material over the intersection point of the row conductors before "printing" of the column conductors, or vice versa. The necessary insulating deposits may for convenience be in the form of strips above the row conductors or below the column conductors. It should be noted, however, that the insulating strips must not interfere with conduction through the photoconductive or electroluminescent elements, as the case may be.

In the operation of such an array a row, for example, may represent an $n$-digit "word" and it will be seen that for serial reading only one photomultiplier is required. Thus energisation of the appropriate row conductor and successive column conductors will result in the required "word" being read out via the photomultiplier digit-by-digit. In another method of operation each $n$-digit "word" may be stored with successive digits in corresponding co-ordinates of $n$ successive planar arrays in which case serial or parallel reading is readily performed by the use of only $n$ photomultipliers, one for each planar array.

In the operation of the array the unit denoted $X_0Y_0$ may be selectively read by applying an A.C. signal between conductor $y_0$ and conductors $x_0$. It will also be clear that common D.C. sources may be employed for each row or just two suitably poled D.C. sources may be switched to the rows with the A.C. source when reading.

A further arrangement employing two photoconductive elements is shown in FIG. 6 by which means an improvement in the discrimination between the two binary representations is achieved. One photoconductive element 18 is connected across the element 3 and the other photoconductive element 19 is connected in series with the element 3, the whole combination being connected across the A.C. source 4 as shown. In the operation of this arrangement, illumination of only the element 18 prohibits fluorescence of element 3 due to the source 4 whereas illumination of only the element 19 causes fluorescence of the element 3 due to the source 4. Such an arrangement effectively reduces the capacity ratio difficulty between electroluminescent and photoconductive elements discussed above.

The arrangement of FIG. 6 may readily be used as a unit of a matrix store and may also take advantage of the D.C. biasing described with reference to FIG. 4. FIG. 7 shows such a unit employing D.C. biasing in which only the elements 8 and 9 are illuminated for fluorescence of element 3 on suitably energising $x_0$ and $y_0$ and only the elements 8′ and 9′ are illuminated to prohibit fluorescence on such energisation.

In the above description it has been suggested that a mask of the punched card type, for example, be interposed between the light source and the photoconductive elements for selectively illuminating these elements.

However, a preferred method is to employ as the light source a video type illuminescent panel in which appropriate electroluminescent elements of the panel corresponding to the photoconductive elements of the store to be illuminated are caused to fluoresce in a known self-sustaining manner.

The invention in one aspect thus provides a storage matrix, information from which may be selectively read at high speed. This high speed access results from the fact that illumination of the photoconductive elements, where appropriate, is permanently present for a particular predetermined information content and such elements cause negligible delay in sensing signals. The electroluminescent elements which fluoresce on sensing do so almost instantaneously so that after the selection of particular units from which information is to be read there is substantially no delay in generating output signals representing the desired information.

Thus the invention provides a rapid access store for permanent information which information may be readily changed and which store may be compact and produced by conventional printing techniques.

We claim:

1. Information storage apparatus comprising a plurality of electroluminescent elements, each associated with a bit of information to be stored, a plurality of photoconductive elements, each being series-connected with a corresponding one of said electroluminescent elements, means for maintaining, without continuous fluorescence of any of said electroluminescent elements, each of said photoconductive elements in one of two predetermined states of conductivity appropriate to the significance of the bit to be stored, means for selectively and temporarily electrically energising each series-connection of electroluminescent element and photoconductive element to ascertain the state of conductivity of each said photoconductive element, and a plurality of further photoconductive elements, each being series-connected with a corresponding one of said electroluminescent elements, said selective energisation means comprising means for selectively switching a series combination of an alternating voltage source and a first D.C. potential source across each of said series-connections of electroluminescent element and its first-mentioned associated photoconductive element and for simultaneously switching a series combination of said alternating voltage source and a second D.C. potential source, of opposite polarity to said first D.C. potential source, across the series-connection of the selected electroluminescent element and its associated further photoconductive element.

2. Information storage apparatus comprising a plurality of electroluminescent elements, each associated with a bit of information to be stored, a plurality of photoconductive elements, each being series-connected with a corresponding one of said electroluminescent elements, means for maintaining, without continuous fluorescence of any of said electroluminescent elements, each of said photoconductive elements in one of two predetermined states of conductivity appropriate to the significance of the bit to be stored, means for selectively interrogating said series-connections of electroluminescent element and photoconductive element to ascertain the state of conductivity of each said photoconductive element, said interrogating means comprising means for temporarily applying an energising voltage to said series-connections, and a plurality of further photoconductive elements, each being series-connected with a corresponding one of said electroluminescent elements, said selective interrogation means comprising means for selectively switching a series combination of an alternating voltage source and a first D.C. potential source across each of said series-connections of electroluminescent element and its first-mentioned associated photoconductive element and for simultaneously switching a series combination of said alternating voltage source and a second D.C. potential source, of opposite polarity to said first D.C. potential source, across the series-connection of the selected electroluminescent element and its associated further photoconductive element.

References Cited in the file of this patent

UNITED STATES PATENTS

| | | |
|---|---|---|
| 2,836,766 | Halsted | May 27, 1958 |
| 2,873,380 | Kazan | Feb. 10, 1959 |
| 2,874,308 | Livingston | Feb. 17, 1959 |
| 2,895,054 | Loebner | July 14, 1959 |
| 2,897,399 | Garvin et al. | July 28, 1959 |
| 2,907,001 | Loebner | Sept. 29, 1959 |